United States Patent
Lee et al.

(10) Patent No.: US 11,083,023 B2
(45) Date of Patent: Aug. 3, 2021

(54) METHOD FOR PERFORMING A RANDOM ACCESS PROCEDURE IN WIRELESS COMMUNICATION SYSTEM AND A DEVICE THEREFOR

(71) Applicant: LG Electronics Inc., Seoul (KR)

(72) Inventors: Sunyoung Lee, Seoul (KR); Jeonggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 16/621,552

(22) PCT Filed: Jun. 15, 2018

(86) PCT No.: PCT/KR2018/006769
§ 371 (c)(1),
(2) Date: Dec. 11, 2019

(87) PCT Pub. No.: WO2018/230995
PCT Pub. Date: Dec. 20, 2018

(65) Prior Publication Data
US 2020/0107375 A1   Apr. 2, 2020

Related U.S. Application Data

(60) Provisional application No. 62/520,457, filed on Jun. 15, 2017.

(51) Int. Cl.
*H04W 74/08* (2009.01)
*H04W 72/14* (2009.01)
(Continued)

(52) U.S. Cl.
CPC ..... *H04W 74/0833* (2013.01); *H04W 72/042* (2013.01); *H04W 72/14* (2013.01); *H04W 74/006* (2013.01)

(58) Field of Classification Search
None
See application file for complete search history.

(56) References Cited

U.S. PATENT DOCUMENTS

2009/0259910 A1* 10/2009 Lee ..................... H04L 1/1864
714/748
2010/0098010 A1   4/2010 Kuo et al.
(Continued)

OTHER PUBLICATIONS

3rd Generation Partnership Project; Technical Specification Group Radio Access Network; "Evolved Universal Terrestrial Radio Access (E-UTRA); Medium Access Control (MAC) protocol specification (Release 14)," 3GPP TS 36.321 V14.2.1, dated Mar. 2017, 106 pages.
(Continued)

*Primary Examiner* — Hong S Cho
(74) *Attorney, Agent, or Firm* — Fish & Richardson P.C.

(57) ABSTRACT

The present invention relates to a wireless communication system. More specifically, the present invention relates to a method and a device for transmitting a random access preamble (hereinafter, message 1); receiving a random access response (hereinafter, message 2) including a first uplink grant and a second uplink grant, as a response to the message 1; performing an initial transmission of a message 3 using the first uplink grant; starting a timer at a time when the initial transmission of a message 3 is performed; and performing a retransmission of the message 3 using the second uplink grant when the timer expires.

14 Claims, 10 Drawing Sheets

(51) Int. Cl.
*H04L 1/18* (2006.01)
*H04W 72/04* (2009.01)
*H04W 74/00* (2009.01)

(56) References Cited

U.S. PATENT DOCUMENTS

| | | | |
|---|---|---|---|
| 2015/0173047 A1* | 6/2015 | Yamada | H04W 28/18 370/329 |
| 2016/0219624 A1 | 7/2016 | Lin et al. | |
| 2016/0302080 A1 | 10/2016 | Hwang et al. | |

OTHER PUBLICATIONS

PCT International Search Report and Written Opinion in International Application No. PCT/KR2018/006769, dated Sep. 27, 2018, 106 pages.

* cited by examiner

(a) Control-Plane Protocol Stack (b) User-Plane Protocol Stack

(a) Control-Plane Protocol Stack

(b) User-Plane Protocol Stack

METHOD FOR PERFORMING A RANDOM ACCESS PROCEDURE IN WIRELESS COMMUNICATION SYSTEM AND A DEVICE THEREFOR

CROSS-REFERENCE TO RELATED APPLICATIONS

This application is a National Stage application under 35 U.S.C. § 371 of International Application No. PCT/KR2018/006769, having an International Filing Date of Jun. 15, 2018, which claims the benefit of U.S. Provisional Ser. No. 62/520,457 filed Jun. 15, 2017. The disclosures of the prior applications are considered part of (and are incorporated by reference in) the disclosure of this application.

TECHNICAL FIELD

The present invention relates to a wireless communication system and, more particularly, to a method for performing a random access procedure in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

Figure 1:
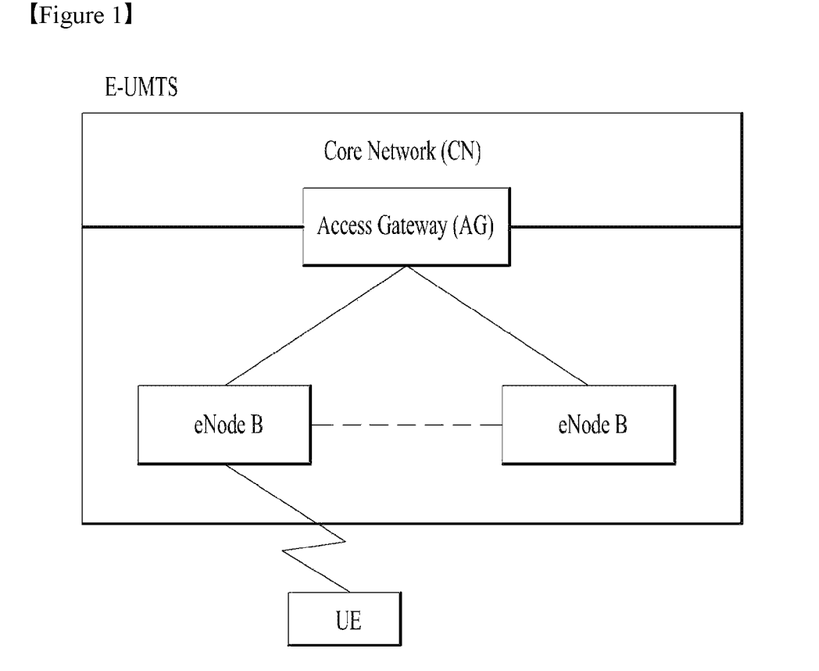
FIG. 1 is a diagram showing a network structure of an Evolved Universal Mobile Telecommunications System (E-UMTS) as an example of a wireless communication system.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention is to provide a method for efficiently performing a random access procedure and an apparatus for the same. Another object of the present invention is to provide a method for efficiently performing a retransmission of a message 3 in the random access procedure.

The technical problems solved by the present invention are not limited to the above technical problems and those skilled in the art may understand other technical problems from the following description.

Technical Solution

As an aspect of the present invention, a method for a user equipment to perform a random access procedure in a wireless communication system is provided, wherein the method comprises: transmitting a random access preamble (hereinafter, message 1); receiving a random access response (hereinafter, message 2) including a first uplink grant and a second uplink grant, as a response to the message 1; performing an initial transmission of a message 3 using the first uplink grant; starting a timer at a time when the initial transmission of a message 3 is performed; and performing a retransmission of the message 3 using the second uplink grant when the timer expires.

As another aspect of the present invention, a User Equipment (UE) for operating in a wireless communication system is provided, wherein the UE comprises: a Radio Frequency (RF) module; and a processor operably coupled with the RF module and configured to: transmit a random access preamble (hereinafter, message 1), receive a random access response (hereinafter, message 2) including a first uplink grant and a second uplink grant, as a response to the message 1, perform an initial transmission of a message 3 using the first uplink grant, start a timer at a time when the initial transmission of a message 3 is performed, and perform a retransmission of the message 3 using the second uplink grant when the timer expires.

Preferably, the timer may stop when a response (hereinafter, message 4) to the message 3 is successfully received.

Preferably, the timer may be a contention resolution timer.

Preferably, the first uplink grant may be different from the second uplink grant.

Preferably, the second message may include information indicating a maximum retransmission number.

Preferably, the timer may be re-started at a time when the first retransmission of the message 3 is performed.

Preferably, the message 3 may be no longer retransmitted when a number of retransmissions of the message 3 reaches the maximum retransmission number, even though the time expires.

[Advantageous Effects]

According to the present invention, it is possible to efficiently perform a random access procedure. In addition, it is possible to efficiently perform a retransmission of a message 3 in the random access procedure.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system, a LTE-advanced (LTE-A) system and a NR system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 2A:
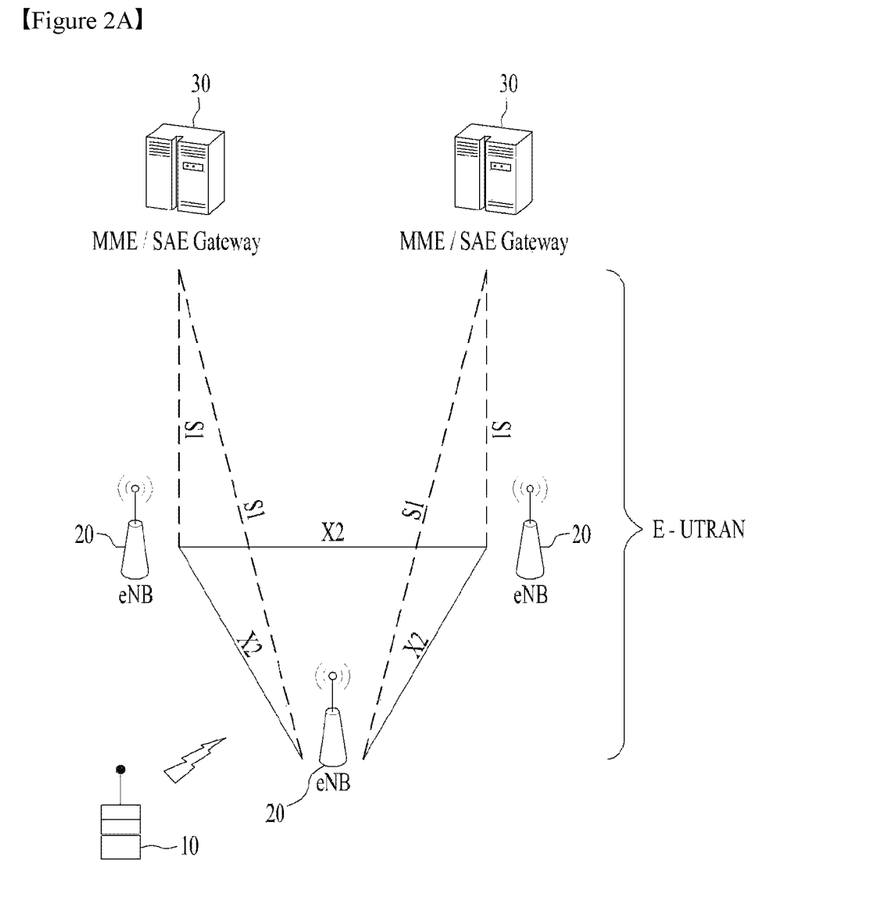
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
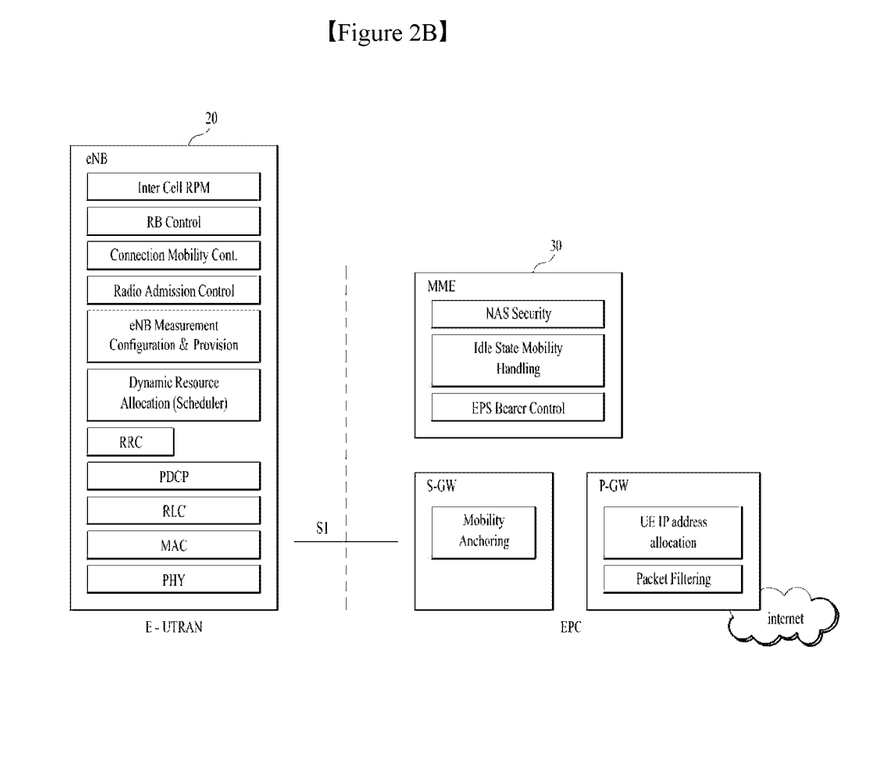
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
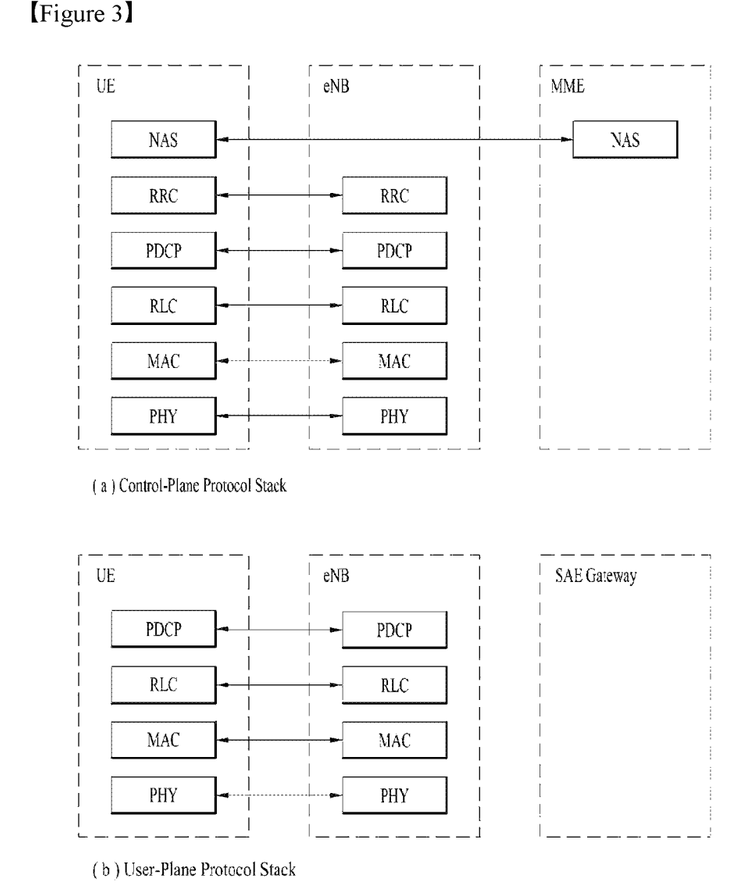
FIG. 3 is a diagram showing a control plane and a user plane of a radio interface protocol between a UE and an E-UTRAN based on a 3rd generation partnership project (3GPP) radio access network standard.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
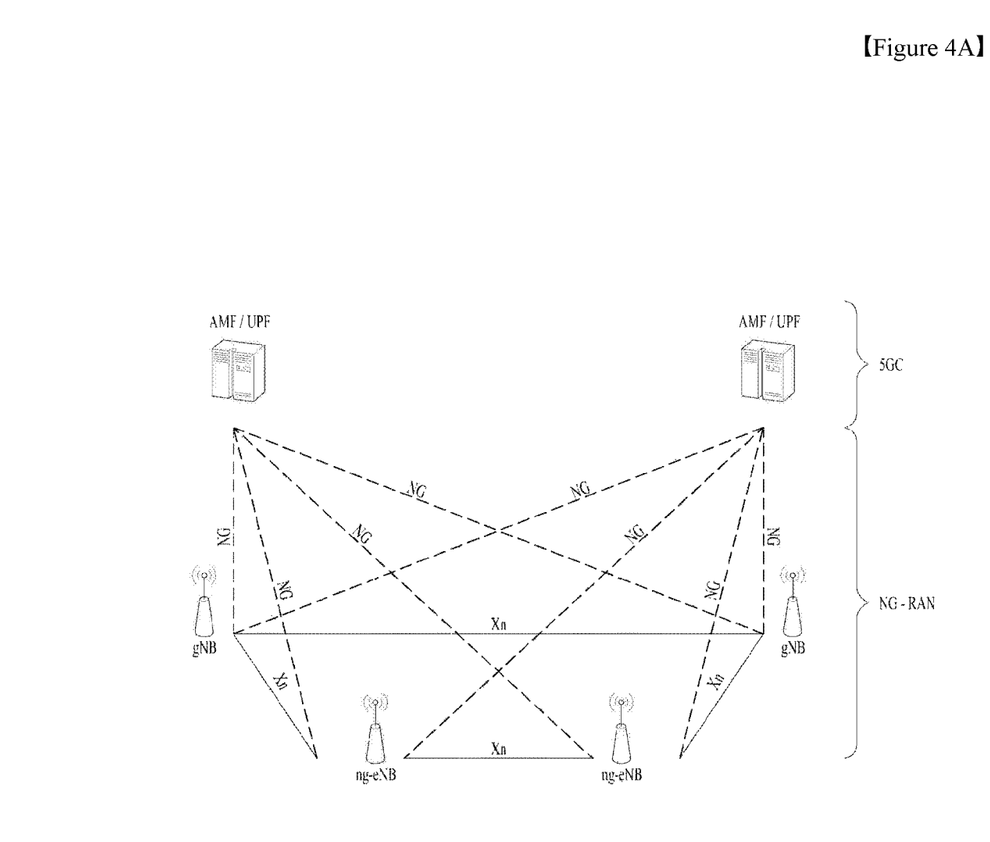
FIG. 4A is a block diagram illustrating network structure of NG Radio Access Network (NG-RAN) architecture.
Figure 4B:
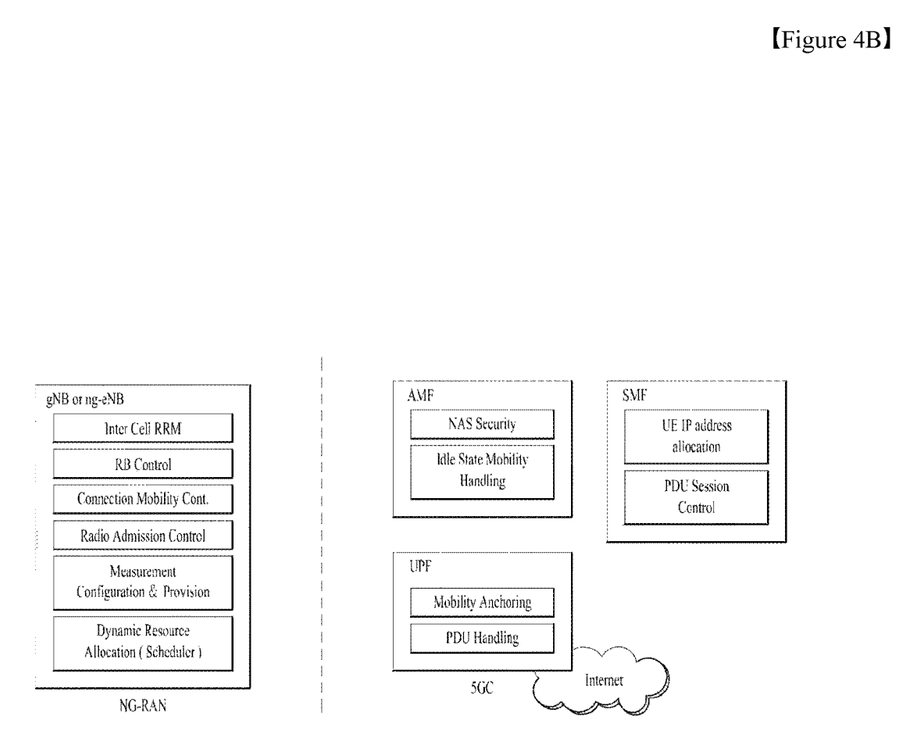
FIG. 4B is a block diagram depicting architecture of functional Split between NG-RAN and 5G Core Network (5GC)

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
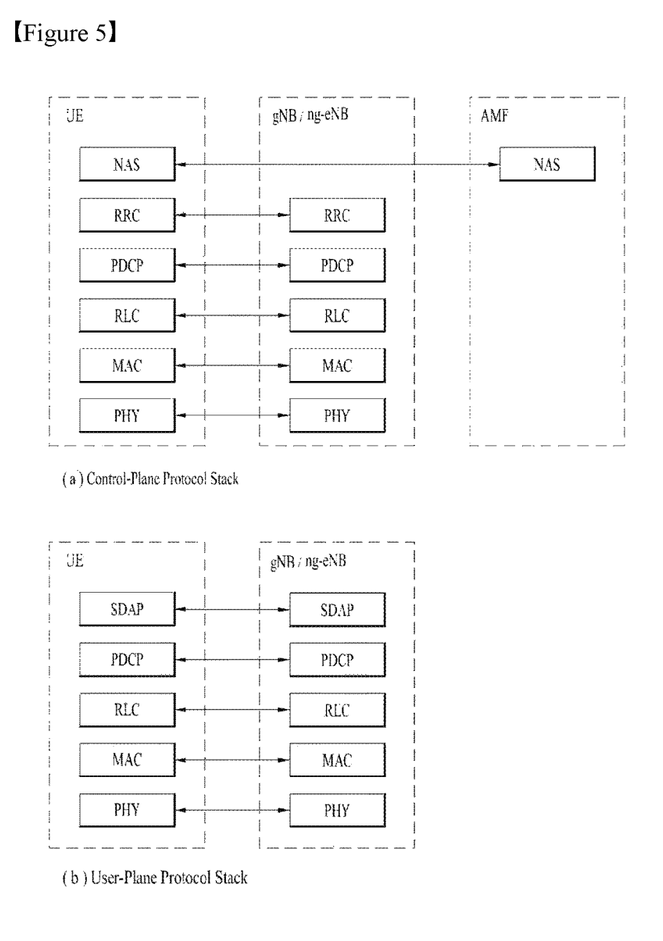
FIG. 5 is a diagram showing a control plane and a user plane of a radio interface protocol between a UE and a NG-RAN based on a 3rd generation partnership project (3GPP) radio access network standard.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

A description will be given of a random access procedure. The random access (RA) procedure is also referred to as a random access channel (RACH) procedure. The random access procedure is used for initial access, uplink synchronization control, resource assignment, handover, etc. The random access procedure is classified into contention-based procedure and a dedicated (i.e. non-contention-based) procedure. In the contention-based random access procedure, a UE randomly selects an RACH preamble sequence. Accordingly, a plurality of UE can simultaneously transmit the same RACH preamble sequence, which requires a contention resolution procedure. In the dedicated random access procedure, a UE uses an RACH preamble sequence uniquely allocated thereto by a BS. Accordingly, the UE can perform the random access procedure without collision with other UEs.

Figure 6A:
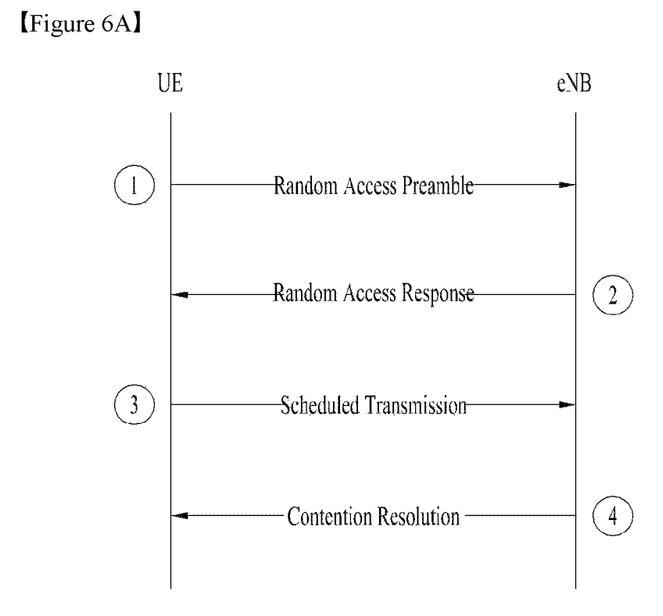
FIGS. 6A and 6B illustrate random access procedures.
Figure 6B:
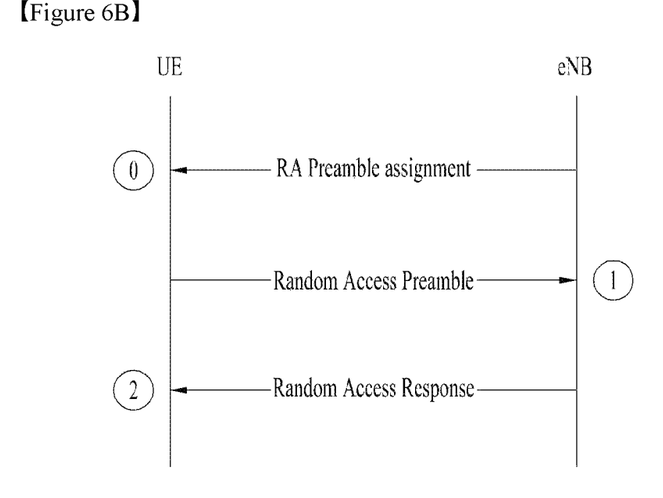

FIGS. 6A and 6B illustrate random access procedures. FIG. 6A shows a contention-based random access procedure and FIG. 6B shows a dedicated random access procedure.

Referring to FIG. 6A, the contention-based random access procedure includes the following four steps. Messages transmitted in steps 1 to 4 may be respectively referred to as messages (Msgs) 1 to 4. The contention-based random access procedure is initiated by the MAC sublayer of a UE.

Step 1: RACH preamble (via PRACH) (UE=>eNB)
Step 2: Random access response (RAR) (via PDCCH and PDSCH) (eNB=>UE)
Step 3: Layer2/Layer3 message (e.g., CCCH SDU) (via PUSCH) (UE=>eNB)
Step 4: Contention resolution message (e.g., MAC control element (CE) including UE contention resolution identity (hereinafter, UE contention resolution identity MAC CE)) (eNB=>UE)

Referring to FIG. 6B, the dedicated random access procedure includes the following three steps. Messages transmitted in steps 0, 1 and 2 may be respectively referred to as messages (Msgs) 0, 1 and 2. Uplink transmission (i.e. Msg3) corresponding to RAR may be performed as part of the random access procedure, which is not shown in the figure. The dedicated random access procedure is initiated by a PDCCH order. The PDCCH order or a RRC layer optionally indicate a random access preamble and PRACH resource.

Step 0: RACH preamble allocation (PDCCH order) (eNB=>UE)
Step 1: RACH preamble (via PRACH) (UE=>eNB)
Step 2: Random access response (RAR) (via PDCCH and PDSCH) (eNB=>UE)
Step 3 (not shown in FIG. 6B): Layer2/Layer3 message (e.g., MAC CE including C-RNTI (hereinafter, C-RNTI MAC CE)) (via PUSCH) (UE=>eNB)

After transmission of the RACH preamble, the UE attempts to receive a RAR within a time window. Specifically, the UE attempts to detect a PDCCH (hereinafter, RA-RNTI PDCCH) having a RA-RNTI (e.g. CRC in the PDCCH is masked with RA-RNTI) within the time window. The UE checks whether a PDSCH corresponding to the RA-RNTI PDCCH includes a RAR therefor when RA-RNTI PDCCH is detected. The RAR includes timing advance (TA) information representing a timing offset for UL synchronization, UL resource allocation information (UL grant), a temporary UE identifier (e.g. temporary Cell-RNTI (TC-RNTI)), etc. The UE may perform an initial UL transmission (i.e., Msg3) according to the UL grant and the TA information in the RAR.

Contention resolution is based on either C-RNTI on PDCCH (e.g., PDCCH whose CRC is masked with C-RNTI) or UE Contention Resolution Identity on DL-SCH (e.g., UE contention resolution identity MAC CE in a MAC PDU). Specifically, a contention resolution procedure is performed by an MAC entity as follows.

Once Msg3 is transmitted, the MAC entity does:
1>start mac-ContentionResolutionTimer and restart mac-ContentionResolutionTimer at each HARQ retransmission of Msg3;
1>if notification of a reception of a PDCCH transmission (e.g., Msg4) is received from a lower layer (e.g., a physical layer), the MAC entity does:
2>if C-RNTI MAC control element was included in Msg3:
3>if the random access procedure was initiated by a MAC layer of the UE or by a RRC layer of the BS, and if the PDCCH transmission (e.g., Msg4) is addressed to C-RNTI and contains an UL grant for a new transmission; or
3>if the random access procedure was initiated by a PDCCH order, and if the PDCCH transmission (e.g., Msg4) is addressed to the C-RNTI:
4>consider this Contention Resolution successful;
4>stop mac-ContentionResolutionTimer;
4>discard the Temporary C-RNTI;
2>else if CCCH SDU was included in Msg3 and the PDCCH transmission (e.g., Msg4) is addressed to its Temporary C-RNTI:
3>if MAC PDU (e.g., in a PDSCH of Msg4) is successfully decoded:
4>stop mac-ContentionResolutionTimer;
4>if the MAC PDU (e.g., in a PDSCH of Msg4) contains a UE Contention Resolution Identity MAC control element; and
4>if the UE Contention Resolution Identity included in the MAC control element matches the 48 first bits of the CCCH SDU transmitted in Msg3:
5>consider this Contention Resolution successful and finish the disassembly and demultiplexing of the MAC PDU;
5>set the C-RNTI to the value of the Temporary C-RNTI;
5>discard the Temporary C-RNTI;
5>consider this Random Access procedure successfully completed.
4>else
5>discard the Temporary C-RNTI;
5>consider this Contention Resolution not successful and discard the successfully decoded MAC PDU.
1>if mac-ContentionResolutionTimer expires:
2>discard the Temporary C-RNTI;
2>consider the Contention Resolution not successful.
1>if the Contention Resolution is considered not successful the MAC entity does:
2>flush the HARQ buffer used for transmission of MAC PDU in Msg3 buffer;
2>based on a backoff parameter, select a random backoff time according to a uniform distribution between 0 and the backoff parameter value;
2>delay a subsequent random access transmission by the backoff time;
2>proceed to a selection of a random access resource and the subsequent Random Access transmission.

In LTE/LTE-A, the HARQ retransmissions of Msg3 is performed using synchronous and (non-)adaptive HARQ operations. For synchronous HARQ, the MAC entity is configured with a maximum number of Msg3 HARQ transmissions by a RRC layer (e.g., signaled via an RRC message from a BS): maxHARQ-Msg3Tx. For transmission of a MAC PDU stored in the Msg3 buffer, the maximum number of transmissions is set to maxHARQ-Msg3Tx. The retransmission of Msg3 is indicated by a PDCCH (i.e., adaptive HARQ) and/or a PHICH (i.e., non-adaptive HARQ). Accordingly, new transmission of Msg3 is performed using a resource indicated by the RAR. Adaptive retransmission of Msg3 is performed on a resource indicated by UL grant of the PDCCH. Non-adaptive retransmission of Msg3 is performed on the same resource as was used for the last made transmission attempt.

Example

Retransmission of a Message 3 in RACH

In a synchronous HARQ procedure, both of non-adaptive retransmission and adaptive retransmission are used, while only adaptive retransmission is used in asynchronous HARQ procedure. Meanwhile, it is agreed that only asynchronous HARQ is supported in 3GPP NR.

As the asynchronous HARQ procedure supports adaptive retransmission, while not supporting a non-adaptive retransmission, it is natural that Msg3 is to be retransmitted using only adaptive retransmission in 3GPP NR. But, this may have an impact on gNB scheduling and RA procedure performance. In RA procedure, once the Msg3 is transmitted, the UE starts mac-ContentionResolutionTimer. And, if Contention Resolution is not successful until mac-ContentionResolutionTimer expires, the UE will retry RA preamble transmission. As there is no non-adaptive retransmission in 3GPP NR, if the gNB wants to order Msg3 retransmission, the gNB should order adaptive retransmission before mac-ContentionResolutionTimer expires so that the UE retransmits Msg3 and restarts mac-ContentionResolutionTimer. But, if the gNB doesn't order an adaptive retransmission before mac-ContentionResolutionTimer expires, it would result in that the UE fails in Contention Resolution although the UE performs Msg3 transmission, for example, only once.

It may be considered as a scheduling restriction or complexity to make the gNB to order the adaptive retransmission always within the mac-ContentionResolutionTimer because:

In 3GPP LTE/LTE-A, the UE can retransmit the Msg3, i.e., by using a non-adaptive retransmission, even without being scheduled for an adaptive retransmission;

In 3GPP NR, for normal uplink data transmissions other than the Msg3, the UE waits until the gNB schedules an adaptive retransmission or a new transmission. Thus, the gNB doesn't need to order the adaptive retransmission within a certain time (e.g., mac-ContentionResolutionTimer expiry).

In the meanwhile, in 3GPP NR, PDCCH overload situation may occur because all retransmissions rely on adaptive retransmission. Therefore, the gNB may not be able to provide a PDCCH for Msg3 retransmission even though the gNB takes care of the Msg3 retransmission more than other uplink retransmissions.

In order to address the above problems, the present invention proposes that when a UE receives an RAR in response to an RAP transmission during an RA procedure, the UE is provided with an UL grant for Msg3 retransmission together with an UL grant for Msg3 initial transmission in the RAR.

Figure 7:
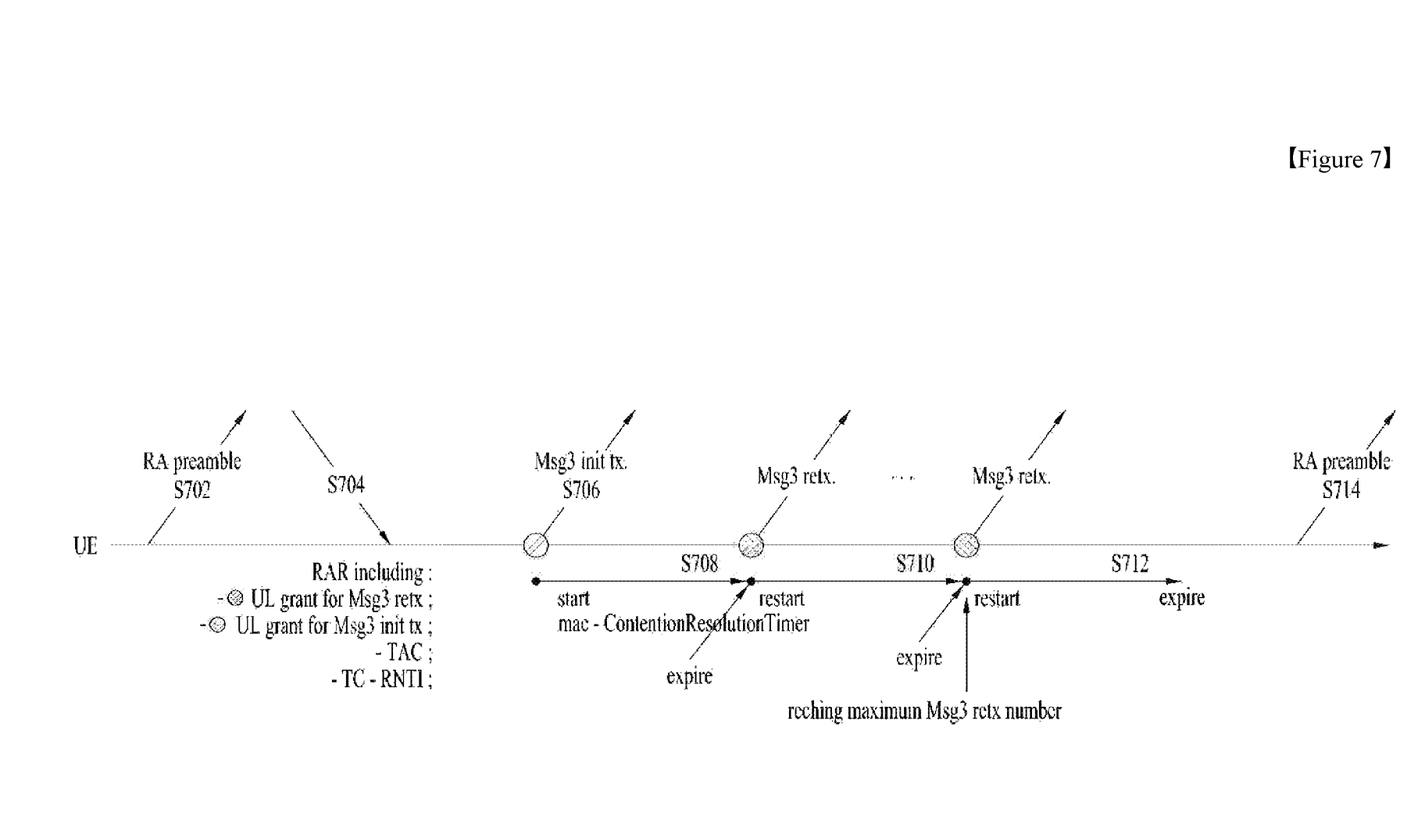
FIG. 7 illustrate a random access procedure according to an example of the present invention.

FIG. 7 shows an example of a random access procedure according to the present invention. Referring to FIG. 7, steps of the random access procedure is performed as follows.

Step 1 (S702). The UE transmits an RA preamble to a network (e.g., gNB).

Step 2 (S704). The network (e.g., gNB) may generate an RAR in response to the RA preamble, and transmit the generated RAR to the UE. The RAR may include at least one of the following information:

An UL grant for Msg3 initial transmission (init tx);
An UL grant for Msg3 retransmission (retx);
A Temporary C-RNTI (TC-RNTI); and
A Timing Advanced Command.

Table 1 shows an example of the UL grant for Msg3 initial transmission.

TABLE 1

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The UL grant for Msg3 retransmission may include at least one of the following information (Only the different information compared to the UL grant for Msg3 initial transmission may be included in the UL grant for Msg3 retransmission):

Maximum Msg3 retransmission number (e.g., max-HARQ-Msg3reTx); and
(Frequency) Hopping Flag, Resource Block assignment, modulation and coding scheme (MCS) scheme, Power, UL delay, channel state information (CSI) field.

Accordingly, the UE may receive an RAR including UL grant for Msg3 retransmission (retx) in response to the RA preamble from the network. If the RAR includes the UL grant for Msg3 retransmission, the UE may consider that Msg3 retransmission can be performed by using the UL grant for Msg3 retransmission. The RAR can be received thorough a PDSCH which is indicated by a PDCCH addressed to RA-RNTI (e.g., a CRC of the PDCCH is masked with the RA-RNTI).

Step 3 (S706). The UE performs an initial transmission of Msg3 by using the UL grant for Msg3 initial transmission (init tx). Once the Msg3 initial transmission is performed, the UE starts a timer, and sets the number of Msg3 retransmissions to an initial value (e.g., zero). Here, the timer is used to specify a time duration during which the UE shall monitor a PDCCH after Msg3 is transmitted. The time duration is defined as the number of consecutive time unit(s) (e.g., subframe, slot or mini-slot). The timer starts/restarts when Msg3 is transmitted, and stops when Contention Resolution is successful. The timer can be ContentionResolutionTimer.

Step 4 (S708). While the timer is running, the UE checks whether an UL grant for adaptive retransmission of Msg3 is newly received from the network. The UL grant for adaptive retransmission of Msg3 can be received through a PDCCH (e.g., a PDCCH addressed to TC-RNTI, i.e., CRC of the PDCCH is masked with TC-RNTI). If the UE receives any UL grant for adaptive retransmission of Msg3 before the timer expires after the previous Msg3 transmission, the UE performs Msg3 retransmission by using the received UL grant for Msg3 retransmission. As the UL grant for Msg3 retransmission may be already included in the RAR, the network may include minimum information in the UL grant for adaptive retransmission of Msg3. For example, the UL grant for adaptive retransmission of Msg3 may include only the different information compared to the UL grant for Msg3 initial transmission or retransmission in the RAR. For example, the UL grant for adaptive retransmission of Msg3 may include only information (e.g., new data indicator (NDI)) associated with indication of Msg3 retransmission. In this case, the UL grant for Msg3 retransmission in the RAR may be reused for Msg3 retransmission even though it is indicated by the PDCCH.

Meanwhile, the UE may perform Msg3 retransmission by using the UL grant for Msg3 retransmission in the RAR, if the following condition(s) are met on a time unit (e.g., subframe, slot or mini-slot) where the timer expires, After the UE transmits the Msg3, the Contention Resolution has not been successful (and, if the maximum number of Msg3 retransmission is not reached).

The timer starts/restarts when the Msg3 transmits, and so the timer expires means that after the UE transmits the previous Msg3, the UE has not received any UL grant for an adaptive retransmission of the Msg3 from the network.

The UL grant for Msg3 retransmission in the RAR may occur as follows:

On time/frequency resource which occurs before a mac-ContentionResolutionTimer expiry, where the UE mac-ContentionResolutionTimer starts upon Msg3 transmission by using the UL grant for Msg3 initial transmission.

On time/frequency resource which occurs on a time unit on which the timer expires.

When the UE performs Msg3 retransmission using a time/frequency resource which occurs on a time unit on which the timer expires, the UE restarts the timer and increments the Msg3 retransmission number by one.

Step 5 (S710). While the timer is running, the UE checks whether an UL grant for adaptive retransmission of Msg3 is newly received from the network. If the UE receives any UL grant for adaptive retransmission of Msg3 before the timer expires after the previous Msg3 transmission, the UE performs Msg3 retransmission by using the received UL grant for Msg3 retransmission. But, if the timer expires after the previous Msg3 transmission without receiving any UL grant for adaptive retransmission of Msg3 and if the Contention Resolution has not been successful (and, if the maximum number of Msg3 retransmission is not reached), the UE performs Msg3 retransmission by using the UL grant for Msg3 retransmission in the RAR. After performing Msg3 retransmission, the UE restarts/starts the timer and increments the Msg3 retransmission number by one.

Meanwhile, if the maximum number of Msg3 retransmission is reached, the UE discards the UL grant for Msg3 retransmission, and doesn't perform any longer the Msg3 retransmission (by using the UL grant for Msg3 retransmission in the RAR). Also, the UE flushes HARQ buffer storing the Msg3.

Step 5 (S712). After reaching the maximum number of Msg3 retransmission, the UE doesn't check whether an UL grant for adaptive retransmission of Msg3 is received. And, if the timer expires (i.e., Contention Resolution is not successful), the UE considers the Contention Resolution fails.

Step 6 (S714). If the contention resolution fails, the UE retries the transmission of a RA preamble. For example, the UE transmits another RA preamble after a backoff time.

Specifically, conventional contention resolution procedure modified as follows.

Once Msg3 is transmitted, the MAC entity does:
1>start ContentionResolutionTimer and restart ContentionResolutionTimer at each HARQ retransmission of Msg3;
1>if notification of a reception of a PDCCH transmission (e.g., Msg4) is received from a lower layer (e.g., a physical layer), the MAC entity does:
2>if C-RNTI MAC control element was included in Msg3:
3>if the random access procedure was initiated by a MAC layer of the UE or by a RRC layer of the BS, and if the PDCCH transmission (e.g., Msg4) is addressed to C-RNTI and contains an UL grant for a new transmission; or
3>if the random access procedure was initiated by a PDCCH order, and if the PDCCH transmission (e.g., Msg4) is addressed to the C-RNTI:
4>consider this Contention Resolution successful;
4>stop ContentionResolutionTimer;
4>discard the Temporary C-RNTI;
2>else if CCCH SDU was included in Msg3 and the PDCCH transmission (e.g., Msg4) is addressed to its Temporary C-RNTI:
3>if MAC PDU (e.g., in a PDSCH of Msg4) is successfully decoded:
4>stop ContentionResolutionTimer;
4>if the MAC PDU (e.g., in a PDSCH of Msg4) contains a UE Contention Resolution Identity MAC control element; and
4>if the UE Contention Resolution Identity included in the MAC control element matches the 48 first bits of the CCCH SDU transmitted in Msg3:
5>consider this Contention Resolution successful and finish the disassembly and demultiplexing of the MAC PDU;
5>set the C-RNTI to the value of the Temporary C-RNTI;
5>discard the Temporary C-RNTI;
5>consider this Random Access procedure successfully completed.
4>else
5>discard the Temporary C-RNTI;
5>consider this Contention Resolution not successful and discard the successfully decoded MAC PDU.
1>if ContentionResolutionTimer expires:
2>if Msg3 retransmission number >maxHARQ-Msg3reTx (or Msg3 retransmission number=maxHARQ-Msg3reTx+1)
3>discard the Temporary C-RNTI;
3>consider the Contention Resolution not successful.
2>else
3>retransmit Msg3 using UL grant for Msg3 retransmission in RAR
3>increment Msg3 retransmission number by 1
(* Msg3 retransmission number/maxHARQ-Msg3reTx can be generalized as Msg3 transmission number/maxHARQ-Msg3Tx in order to count an initial transmission as well)
1>if the Contention Resolution is considered not successful the MAC entity does:
2>flush the HARQ buffer used for transmission of MAC PDU in Msg3 buffer;
2>based on a backoff parameter, select a random backoff time according to a uniform distribution between 0 and the backoff parameter balue;
2>delay a subsequent random access transmission by the backoff time;
2>proceed to a selection of a random access resource and the subsequent Random Access transmission.

The present invention can be applied only to the contention-based random access.

The present invention can be also applied to a case where the UL grant for Msg3 retransmission may not be explicitly included in the RAR, but can be pre-defined between UE and the network. For example, the UL grant for Msg3 retransmission can be pre-defined between UE and the network based on TC-RNTI. That is, the UL grant for Msg3 retransmission can be pre-defined per TC-RNTI (e.g., TC-RNTI-specific default UL grant).

Figure 8:
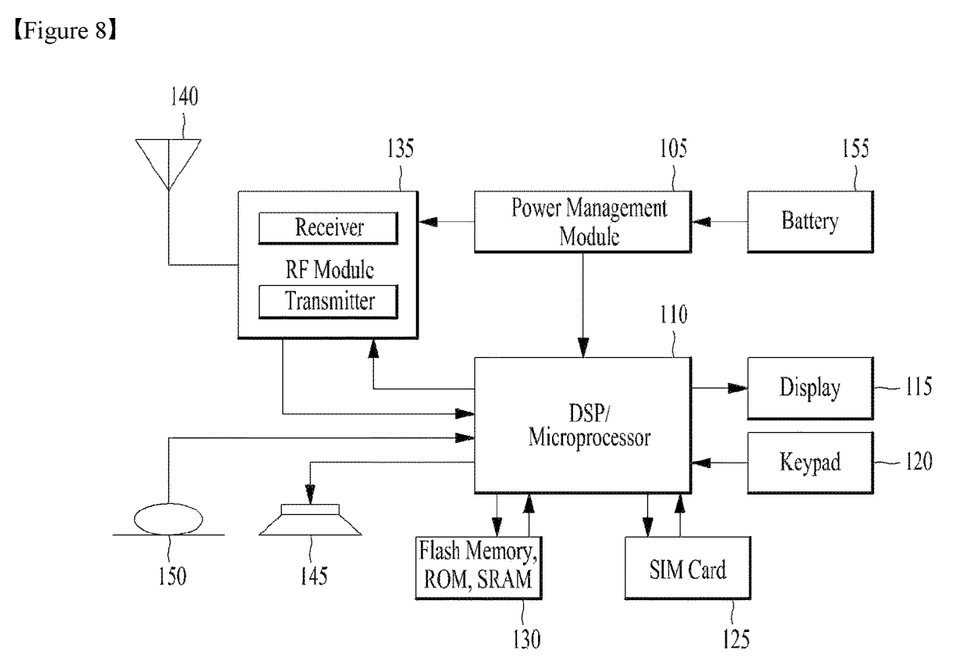
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB (or gNB) adapted to perform the above mechanism, but it can be any apparatus for performing the same operation.

As shown in FIG. 8, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive radio signals from a network, and a transmitter (135) configured to transmit radio signals to the network. These receiver and the transmitter can constitute the transceiver (135). This processor (110) is connected to the transceiver (135: receiver and transmitter), and configured to implement the procedures and/or methods proposed by the present invention.

Also, FIG. 8 may represent a network apparatus (e.g., eNB or gNB) comprising a transmitter (135) configured to transmit radio signals to a UE and a receiver (135) configured to receive radio signals from the UE. These transmitter and receiver may constitute the transceiver (135). The network further comprises a processor (110) connected to the transmitter and the receiver. This processor (110) is connected to the transceiver (135: receiver and transmitter), and configured to implement the procedures and/or methods proposed by the present invention.

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' or 'gNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a user equipment to perform a random access procedure in a wireless communication system, the method comprising:
   transmitting a random access preamble (hereinafter, message 1);
   receiving a random access response (hereinafter, message 2) including a first uplink grant and a second uplink grant, as a response to the message 1;
   performing an initial transmission of a message 3 using the first uplink grant;
   starting a timer at a time when the initial transmission of a message 3 is performed; and
   performing a retransmission of the message 3 using the second uplink grant when the timer expires.

2. The method of claim 1, wherein the timer stops when a response (hereinafter, message 4) to the message 3 is successfully received.

3. The method of claim 1, wherein the timer is a contention resolution timer.

4. The method of claim 1, wherein the first uplink grant is different from the second uplink grant.

5. The method of claim 1, wherein the second message includes information indicating a maximum retransmission number.

6. The method of claim 1, wherein the timer is re-started at a time when the first retransmission of the message 3 is performed.

7. The method of claim 1, wherein the message 3 is no longer retransmitted when a number of retransmissions of the message 3 reaches the maximum retransmission number, even though the time expires.

8. A User Equipment (UE) for operating in a wireless communication system, the UE comprising:
   a Radio Frequency (RF) module; and
   a processor operably coupled with the RF module and configured to:
   transmit a random access preamble (hereinafter, message 1),
   receive a random access response (hereinafter, message 2) including a first uplink grant and a second uplink grant, as a response to the message 1,
   perform an initial transmission of a message 3 using the first uplink grant,
   start a timer at a time when the initial transmission of a message 3 is performed, and
   perform a retransmission of the message 3 using the second uplink grant when the timer expires.

9. The UE of claim 8, wherein the timer stops when a response (hereinafter, message 4) to the message 3 is successfully received.

10. The UE of claim 8, wherein the timer is a contention resolution timer.

11. The UE of claim 8, wherein the first uplink grant is different from the second uplink grant.

12. The UE of claim 8, wherein the second message includes information indicating a maximum retransmission number.

13. The UE of claim 8, wherein the timer is re-started at a time when the first retransmission of the message 3 is performed.

14. The UE of claim 8, wherein the message 3 is no longer retransmitted when a number of retransmissions of the message 3 reaches the maximum retransmission number, even though the time expires.

* * * * *